United States Patent [19]
Shibata et al.

[11] Patent Number: 6,008,287
[45] Date of Patent: Dec. 28, 1999

[54] ADHESIVE COMPOSITION

[75] Inventors: Yutaka Shibata, Osaka; Choji Tomizawa, Chiba, both of Japan

[73] Assignee: Sumitomo Chemical Co., Ltd., Osaka, Japan

[21] Appl. No.: 08/976,720

[22] Filed: Nov. 24, 1997

[30] Foreign Application Priority Data

Nov. 26, 1996 [JP] Japan ..................................... 8-314647

[51] Int. Cl.⁶ ..................................................... C08K 5/02
[52] U.S. Cl. .......................... 524/510; 524/511; 524/524; 524/563; 524/597
[58] Field of Search .................................. 524/510, 511, 524/524, 563, 597

[56] References Cited

U.S. PATENT DOCUMENTS 4,687,809  8/1987  Kamikaseda et al. .................. 524/510
5,367,010  11/1994  Gervase et al. .......................... 524/510

FOREIGN PATENT DOCUMENTS 805721  5/1951  Germany .
44-29597  12/1969  Japan .

*Primary Examiner*—Rabon Sergent
*Assistant Examiner*—Olga Asinovsky
*Attorney, Agent, or Firm*—Sughrue, Mion, Zinn, Macpeak & Seas, PLLC

[57] ABSTRACT

An adhesive composition obtainable by blending a component (C) to components (A) and (B), wherein the weight ratio of (A)/(B) is from 95/5 to 40/60, and the amount of the component (C) is from 5 to 50 parts by weight based on 100 parts by weight of the total amount of the components (A) and (B):

(A): a condensate of resorcinol and formaldehyde or a condensate of resorcinol, phenol and formaldehyde, (B): an aqueous emulsion containing an ethylene-vinyl acetate-based copolymer and the weight ratio of ethylene/vinyl acetate is from 3/97 to 40/60, (C): a formaldehyde-based hardening agent or a hexamethylenetetramine-based hardening agent.

4 Claims, No Drawings

ADHESIVE COMPOSITION

BACKGROUND OF THE INVENTION

1. Field of the Invention

The present invention relates to an adhesive composition. More particularly, it relates to an adhesive composition containing a resorcinol-based adhesive as a base, which can maintain adhesive ability and gelation time at fully satisfactory levels, provides excellent processability after hardening of an adhesive by imparting suitable plasticity to the adhesive, does not cause cracking of an adhesive layer, and realizes excellent productivity.

2. Description of the Related Art

A resorcinol-based adhesive mainly composed of a resorcinol resin is an excellent adhesive in view of being able to maintain high adhesion for long period. However, the resorcinol-based adhesive have problems that a hardened adhesive layer is extremely hard, therefore when a wood article obtained by adhesion is cut, a cutting blade used is split, and when the adhesive layer is thick, cracking occurs.

SUMMARY OF THE INVENTION

The present inventors have intensively studied an adhesive composition which does not have the above-mentioned problems and have found that an adhesive composition obtainable by blending specific amount of a specific copolymer to a resorcinol resin can maintain adhesive ability and gelation time at fully satisfactory levels, provides excellent processability after hardening of an adhesive by imparting suitable plasticity to the adhesive, does not cause cracking of an adhesive layer, realizes excellent productivity, and have completed the present invention.

That is, the present invention provides an adhesive composition obtainable by blending a component (C) to components (A) and (B), wherein the weight ratio of (A)/(B) is from 95/5 to 40/60, and the amount of the component (C) is from 5 to 50 parts by weight based on 100 parts by weight of the total amount of the components (A) and (B):

(A): a condensate of resorcinol and formaldehyde or a condensate of resorcinol, phenol and formaldehyde, (B): an aqueous emulsion containing an ethylene-vinyl acetate-based copolymer and the weight ratio of ethylene/vinyl acetate is from 3/97 to 40/60, (C): a formaldehyde-based hardening agent or a hexamethylenetetramine-based hardening agent.

The component (A) is a condensate of resorcinol and formaldehyde, or a condensate of resorcinol which is partly substituted by phenol, phenol and formaldehyde.

The component (A) is a resin obtained by addition condensation of not more than 1 mol of formaldehyde to 1 mol of resorcinol or 1 mol of total amount of resorcinol and phenol. As the component (A), corresponding commercially available products can be used.

The component (B) of the present invention is an aqueous emulsion containing an ethylene-vinyl acetate-based copolymer and the weight ratio of ethylene/vinyl acetate is from 3/97 to 40/60, or an aqueous emulsion containing an ethylene-vinyl chloride-based copolymer and the weight ratio of ethylene/vinyl chloride is from 3/97 to 40/60. When the ratio of ethylene is too low, plasticity effect by the component (A) can not be obtained since plasticity effect by the aqueous emulsion decreases. On the other hand, when the ratio is too high, sufficient strength of an adhesive layer can not be obtained and adhesion strength decreases. The weight ratio of ethylene/vinyl acetate and the weight ratio of ethylene/vinyl chloride are preferably from 5/95 to 35/65. The solid content of the aqueous emulsion is preferably from 30 to 70%.

The component (B) is produced by usual emulsion polymerization.

When an aqueous emulsion containing an ethylene-vinyl chloride-based copolymer is obtained, it is preferable to use an anionic surfactant as an emulsifier in polymerization for easy miscibility with the component (A). The examples of the anionic surfactant include sodium lauryl sulfate, sodium dodecylbenzene sulfonate, sodium dialkylsulfo succinate, sodium polyoxyethylenealkyl ether sulfate, sodium polyoxyethylenealkylphenol ether sulfate and the like. When the emulsion system of the component (B) is a protective colloid system such as polyvinyl alcohol and hydroxyethyl cellulose, it is preferable that pH of the component (B) is previously regulated at not less than 7 to improve miscibility with the component (A). On the other hand, when the emulsion system of the component (B) is an anionic surfactant, it is possible to conduct sufficient mixing with the component (A) even if regulation of pH is not conducted previously.

The component (C) of the present invention is a formaldehyde-based hardening agent or a hexamethylenetetramine-based hardening agent. As the formaldehyde-based hardening agent, formaldehyde, paraformaldehyde and the like are exemplified. AS the hexamethylenetetramine-based hardening agent, hexamethylenetetramine and the like are exemplified. Such as hardening agent is added mainly for hardening of the component (A), and optionally, fillers such as a walnut shell powder, palm shell powder, wood powder, bark powder and the like, and bulking agents such as a wheat flour and the like can also be added. Further, it is also possible to use an amino resin and phenol resin containing free formaldehyde, or formaldehyde as a hardening agent. As the component (C), corresponding commercially available products may be used.

The adhesive composition of the present invention is an adhesive composition obtainable by blending the component (C) to the above-described components (A) and (B), wherein the weight ratio of (A)/(B) is from 95/5 to 40/60, and the amount of the component (C) is from 5 to 50 parts by weight based on 100 parts by weight of the total amount of the components (A) and (B). The amount of the component (B) is based on the weight of the total amount of aqueous emulsion comprising the copolymer and water. And the amount of the component (C) is based on the weight of the total amount of the hardening agent comprising some kinds of additives.

When the weight ratio of the component (B) is too low, plasticity effect of an adhesive layer can not be fully obtained, and effects for preventing splitting of a blade when an adhered wood is processed and for preventing cracking which occurs when the adhesive layer is too thick are not shown. The ratio is preferably from 90/10 to 50/50.

When the amount of the component (C) is too small, excellent adhesion can not be obtained since hardening of the component (A) becomes insufficient. On the other hand, the amount is too large, excess hardening agent remains in the adhesive layer, and when used as a building material, there is a problem that released volatile components exert a bad influence on human bodies. The amount of the component (C) is preferably from 10 to 30 parts by weight.

To obtain the adhesive composition of the present invention, for example, the following methods are listed. The component (A) is mixed with the component (B) to obtain a mixture. When the composition is used as an adhesive, the component (C) is added to the mixture and the resulted mixture is applied on a adherent. It is also possible that the component (B) is mixed with the component (C), and the component (A) is added directly before use. As the adherent, for example, wood, slate, concrete and the like can be used.

In the adhesive composition of the present invention, adhesive ability and gelation time are maintained at fully satisfactory levels, and suitable plasticity is given to an adhesive, therefore, processability after hardening of the adhesive is excellent, cracking in an adhesive layer scarcely occur, a nd production cost can be suppressed.

EXAMPLES

The following examples furt her illustrate the present invention in detail, however, needless to say, they are not to be construed to limit the scope thereof.

Examples 1–9 and Comparative Examples 1–5

The adhesive compositions were obtained by blending the components (C) to the components (A) and (B) described in Tables 1 to 3. The resulted adhesive compositions were subjected to measurements and evaluations as follows. The conditions and results are shown in Tables 1 to 3.

The measuring and evaluation methods for adhesion ability, gelation time, hardness and cracking are as follows.

1. Evaluation of Adhesion Ability

The evaluation was conducted according to Phenolic Resin Adhesives for Wood (JIS K 6802).

(1) Preparation of Sample

The adhesive as blended above was applied on each one side of two pieces of straight-grained birch boards (10 mm×25 mm×30 mm) in a total amount from 0.16 to 0.20 g (260 to 320 $gm^2$), the applied surfaces were put each other in layer and pressed for 24 hours at a load of 8 $kgf/cm^2$, then left for 1 week to obtain a sample.

(2) Ordinary Condition Strength

Compressive-shear adhesive strength of the sample as prepared above was measured by a compression tester (Autograph DCS-5000) manufactured by Shimadzu Co. The ordinary condition strength is preferably not less than 100 $kgf/cm^2$.

(3) Repeated Boiling Strength

The sample as prepared above was immersed in boiling water for 4 hours, dried in an oven at 60° C. for 20 hours, immersed again in boiling water for 4 hours, then immersed in water at ordinary temperature for 15 minutes or more to be cooled to ordinary temperature, and compressive-shear adhesive strength of the sample was measured in wet condition by a compression tester (Autograph DCS-5000) manufactured by Shimadzu Co. The repeated boiling strength is preferably not less than 60 $kgf/cm^2$.

2. Gelation Time

Gelation time was measured according to Phenolic Resin Adhesives for Wood(JIS K 6802).

An adhesive main agent obtained by blending the components (A) and (B) was immersed in a thermostatic bath at 25° C. for 1 hour or more. After the temperature of the adhesive main agent reaches constant temperature, the component (C) was quickly mixed with stirring with reading the start time simultaneously, and the adhesive was immersed in a thermostatic bath at 25° C. Then, this adhesive was sometimes stirred, and the time until the adhesive was not sticky to a stirring rod was measured when the stirring rod was contacted with the surface of the adhesive and lifted. The gelation time is preferably from 20 to 300 minutes.

3. Hardness

The adhesive composition was charged in a vessel having flat bottom so that the thickness thereof was 12 mm or more, and allowed to stand for 4 day or more without any treatment for hardening to obtain a cylindrical sample. Using this sample, there was conducted measurement of A hardness of spring type hardness test using a rubber·plastic digital mode hardness tester (RH-101A) manufactured by Excell K. K. according to Vulcanized Rubber Physical Test Method (JIS K 6301). The hardness is preferably from 30 to 60.

4. Cracking

The appearance of the sample used for the hardness test was observed, and evaluated by ○ (no cracking), Δ (slight cracking) and X (cracking).

TABLE 1

| | | Example | | | | |
|---|---|---|---|---|---|---|
| | | 1 | 2 | 3 | 4 | 5 |
| Formulation | | | | | | |
| (A) Kind*1 | | A-1 | A-2 | A-3 | A-3 | A-1 |
| (parts by weight) | | 70 | 70 | 70 | 70 | 70 |
| (B) Kind*2 | | B-1 | B-1 | B-1 | B-2 | B-3 |
| (parts by weight) | | 30 | 30 | 30 | 30 | 30 |
| (C) Kind*3 | | C-1 | C-1 | C-1 | C-1 | C-1 |
| (parts by weight) | | 21 | 21 | 21 | 21 | 21 |
| Evaluation result | | | | | | |
| Compressive-shear adhesive strength | Ordinary condition ($kgf/cm^2$) | 143 | 192 | 172 | 184 | 170 |
| | Wood part fracture rate (%) | 0 | 15 | 80 | 75 | 20 |
| | Repeated boiling ($kgf/cm^2$) | 69 | 88 | 86 | 74 | 74 |
| | Wood part fracture rate (%) | 30 | 90 | 80 | 55 | 70 |
| Gelation time (minute) | | 90 | 60 | 60 | 60 | 20 |
| Hardness (–) | | 52 | 55 | 56 | 57 | 34 |
| Cracking | | ○ | ○ | ○ | ○ | ○ |

TABLE 2

| | | Example | | | |
|---|---|---|---|---|---|
| | | 6 | 7 | 8 | 9 |
| Formulation | | | | | |
| (A) Kind*1 | | A-3 | A-2 | A-3 | A-1 |
| (parts by weight) | | 70 | 50 | 50 | 90 |
| (B) Kind*2 | | B-4 | B-1 | B-1 | B-1 |
| (parts by weight) | | 30 | 50 | 50 | 10 |
| (C) Kind*3 | | C-1 | C-1 | C-1 | C-1 |
| (parts by weight) | | 21 | 15 | 15 | 27 |
| Evaluation result | | | | | |
| Compressive-shear adhesive strength | Ordinary condition ($kgf/cm^2$) | 165 | 141 | 173 | 198 |
| | Wood part fracture rate (%) | 100 | 30 | 60 | 5 |
| | Repeated boiling ($kgf/cm^2$) | 79 | 71 | 76 | 75 |
| | Wood part fracture rate (%) | 75 | 90 | 90 | 25 |
| Gelation time (minute) | | 20 | 60 | 60 | 90 |

TABLE 2-continued

| | Example | | | |
|---|---|---|---|---|
| | 6 | 7 | 8 | 9 |
| Hardness (−) | 56 | 43 | 46 | 60 |
| Cracking | ○ | ○ | ○ | Δ |

TABLE 3

| | Comparative example | | | | |
|---|---|---|---|---|---|
| | 1 | 2 | 3 | 4 | 5 |
| Formulation | | | | | |
| (A) Kind*1 | A-1 | A-2 | A-3 | A-2 | A-2 |
| (parts by weight) | 100 | 100 | 100 | 35 | 35 |
| (B) Kind*2 | — | — | — | B-3 | B-1 |
| (parts by weight) | 0 | 0 | 0 | 65 | 65 |
| (C) Kind*3 | C-1 | C-1 | C-1 | C-1 | C-1 |
| (parts by weight) | 30 | 30 | 30 | 11 | 11 |
| Evaluation result | | | | | |
| Compressive-shear adhesive strength | Ordinary condition (kgf/cm²) | 153 | 194 | 198 | 142 | 149 |
| | Wood part fracture rate (%) | 0 | 65 | 65 | 10 | 20 |
| | Repeated boiling (kgf/cm²) | 74 | 80 | 78 | 43 | 49 |
| | Wood part fracture rate (%) | 65 | 100 | 80 | 10 | 25 |
| Gelation time (minute) | 90 | 60 | 60 | 20 | 60 |

TABLE 3-continued

| | Comparative example | | | | |
|---|---|---|---|---|---|
| | 1 | 2 | 3 | 4 | 5 |
| Hardness (−) | 60 | 62 | 66 | 28 | 33 |
| Cracking | X | X | X | ○ | ○ |

What is claimed is:

1. An adhesive composition comprising a blend of components (A), (B), and (C), wherein the weight ratio of (A)/(B) is from 95/5 to 40/60, and the amount of component (C) is from 5 to 50 parts by weight based on 100 parts by weight of the total amount of components (A) and (B):

(A): a condensate of resorcinol and formaldehyde or a condensate of resorcinol, phenol and formaldehyde, (B): an aqueous emulsion consisting essentially of an ethylene-vinyl chloride-based copolymer, wherein the ethylene-vinyl chloride-based copolymer has an ethylene/vinyl chloride weight ratio of 3/97 to 40/60, (C): a formaldehyde-based hardening agent or a hexamethylenetetramine-based hardening agent.

2. The adhesive composition according to claim 1, wherein the aqueous emulsion (B) is prepared by using an anionic surfactant as an emulsifier in polymerization.

3. The adhesive composition of claim 1, wherein component (A) is a condensate of resorcinol and formaldehyde.

4. The adhesive composition of claim 1, wherein component (A) is a condensate of resorcinol, phenol and formaldehyde.

* * * * *